Nov. 25, 1969   E. H. LORBEER   3,479,745
DIMENSIONAL MEASURING MACHINE FOR TEST SPECIMENS
Filed Feb. 10, 1969   2 Sheets-Sheet 1
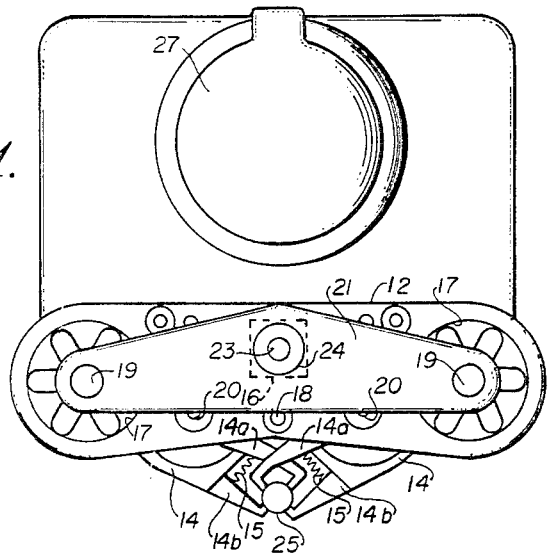
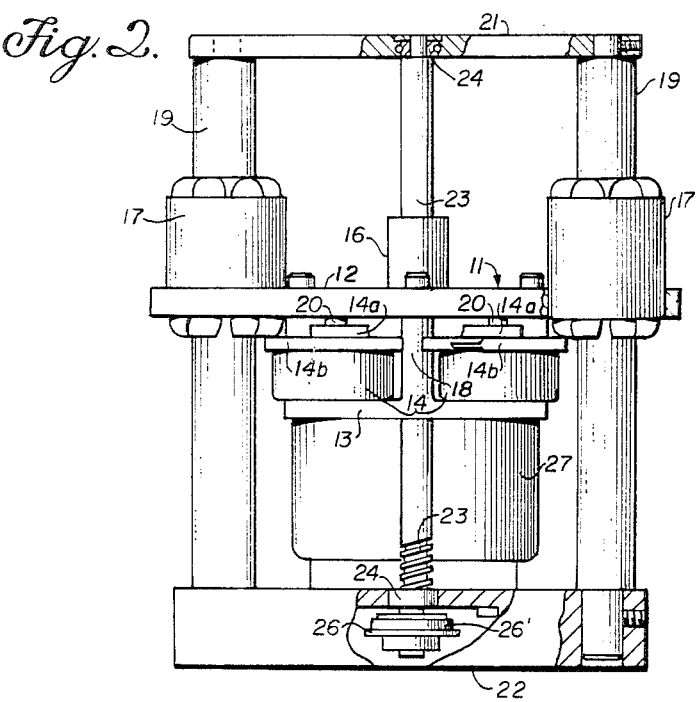
INVENTOR.
ERNEST H. LORBEER
BY
ATTORNEY

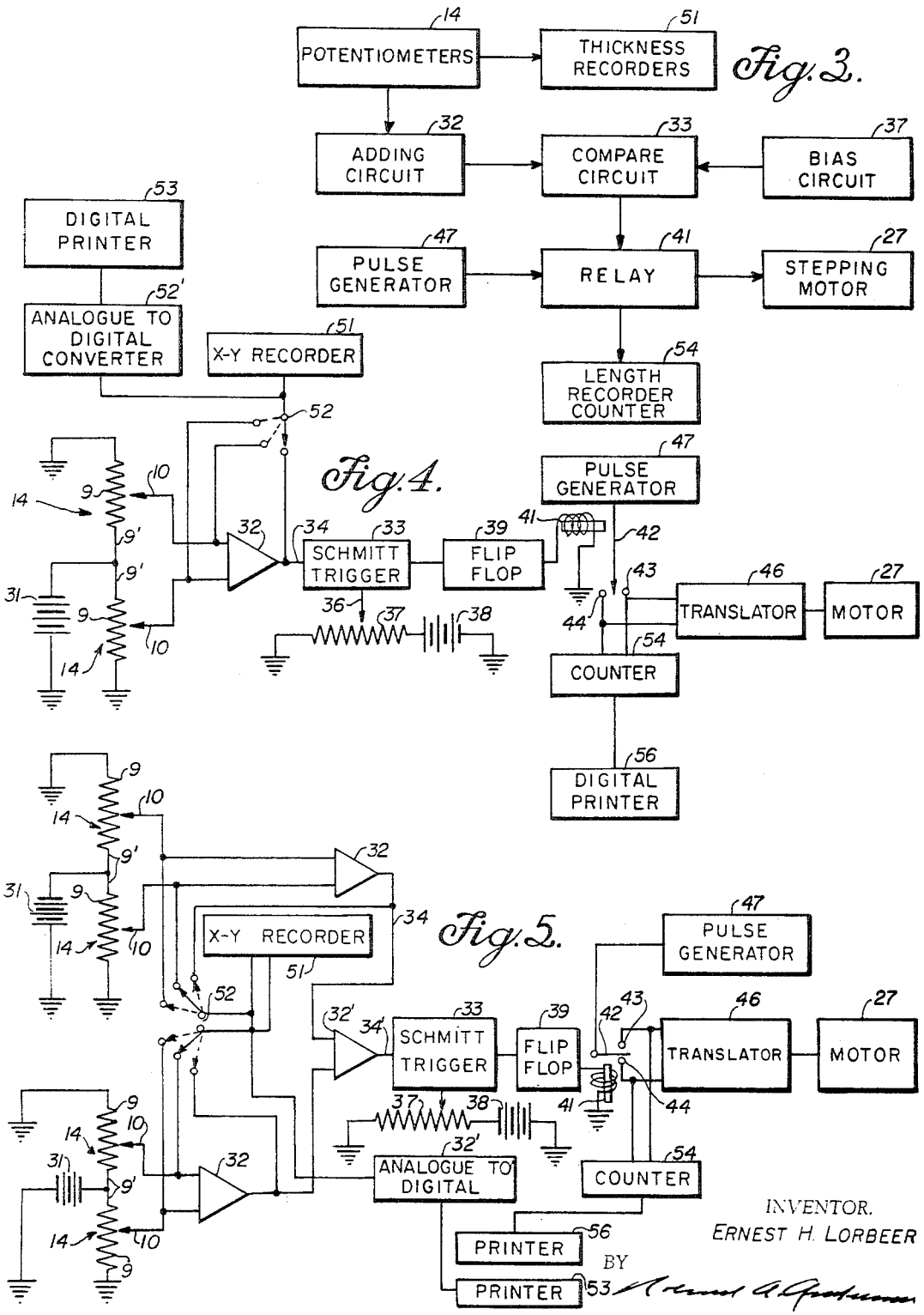

United States Patent Office 3,479,745
Patented Nov. 25, 1969

3,479,745
DIMENSIONAL MEASURING MACHINE FOR TEST SPECIMENS
Ernest H. Lorbeer, Livermore, Calif., assignor to the United States of America as represented by the United States Atomic Energy Commission
Filed Feb. 10, 1969, Ser. No. 797,764
Int. Cl. G01b 5/00
U.S. Cl. 33—174                    10 Claims

ABSTRACT OF THE DISCLOSURE

An apparatus for measuring changing cross-sectional areas and length of a specimen undergoing tensile or compressive test. The apparatus comprises a set of movable potentiometers which act as electrical micrometers, the voltage dividers thereof being actuated by feeler arms which contact the specimen. As the feeler arms scan the specimens by traversing its length back and forth, the voltages of the potentiometer are recorded and indicate changes in the cross-sectional area of the specimen. In operation, a stepping motor upon command of a pulse generator drives a movable assembly holding the potentiometers. A combination of electronic circuits provides instructions for changing the direction of the movable assembly when the assembly has scanned the length of the specimen. Thus, the cross-sectional area and length of a specimen under tensile or compressive testing may be continuously monitored and observed as it continuously changes.

Background of the invention

The invention described herein was made in the course of, or under, Contract No. W–7405–ENG–48, with the United States Atomic Energy Commission.

This invention relates to a machine for use in the testing of specimens by loading, and more particularly, to a machine which continuously measures the changing cross-sectional area and simultaneously measures the increasing length of a specimen while under load.

It is well known that the engineering stress-strain curve does not give a true indication of the deformation characteristics of a metal because it is based entirely on the original dimensions of the specimen, and these dimensions change continuously during the test. A ductile metal which is pulled in tension becomes unstable and necks down during the course of the test. Because the cross-sectional area of the specimen is decreasing rapidly at this stage in the test, the load required to continue deformation falls off. On the other hand, if the true stress, based on the actual cross-sectional area of the specimen is used, it is found that the stress-strain curve increases continuously up to fracture.

Also, in the past, the usual method of determining a true stress-strain curve has been to measure the cross-sectional area of the specimen at increments of load up to fracture. Micrometers or special dial gauges have been used, with care being taken to measure the minimum diameter of the specimen. However, to correct precisely for the complex stresses at the neck, it is necessary to know the profile of the contour of the neck. This prior method of determination is limited to fairly slow rates of strain and to tests at room temperature.

Therefore, in the testing of mechanical specimens, the test data to date is generally referenced to the dimensions or cross-section of the original material, although it is well known that these will change. For example, a tensile specimen will decrease in diameter as it is elongated. At the present time if the true stress is needed the test is periodically interrupted and the minimum diameter measured, a time consuming process which is rarely used.

Measurements are made to gauge the stress versus strain relationship of a specimen material. Stress is measured in units of force per unit area, while strain is measured in units of change in length per unit length. The requisite force is provided by a machine which loads the tensile specimen. Once the force is known, the other parameters mentioned above are estimated to be the same until loading is stopped and the parameters are again measured.

While the above discussion of the prior approaches has been directed to tensile testing, data for compressive tests of specimens have been referenced to the original dimensions, which, in this case, increase in diameter as it is compressed. As the diameter decreases in tensile tests or increases in compressive tests, forces per unit area increase or decrease proportionally and introduce errors and uncertainties in the data obtained by the test unless appropriate correction of these forces is made.

Summary of the invention

The present invention overcomes the above-mentioned problems of the prior art devices in that it measures and records the changing dimensions, length and cross-section, of a specimen under either tensile or compression test without interrupting the test. Further, measurements are made continuously to provide a time record of the specimen's history for later study or for on-line computer analysis. This is accomplished by scanning micrometers which produce signals indicative of the cross-sectional area and length, continuous measurement being achieved by control circuits which change the directions of motion as the scanning micrometers reach the end of the specimen where the cross-sectional area is increased under tensile test or decreased under compressive test.

Therefore, it is an object of this invention to provide a machine which can continuously measure the cross-sectional area of a test specimen under load or under compression.

A further object of the invention is to provide a machine which can continuously measure the length of a test specimen under tensile or compressive test conditions.

Another object of the invention is to provide a specimen testing machine, whereby the shrinking cross-sectional area and increasing length of a test specimen of elongated shape can be continuously measured and recorded.

Other objects of the invention will become readily apparent from the following description and accompanying drawings.

Brief description of the drawings

FIGURE 1 is a plan view of an embodiment of the inventive machine;

FIGURE 2 is a side elevation of the FIGURE 1 machine with portions cut-away or omitted for purposes of clarity;

FIGURE 3 is a block diagram of the electrical circuitry of the FIGURE 1 machine;

FIGURE 4 is a schematic view of the circuitry of the FIGURE 1 machine; and

FIGURE 5 is a schematic view of a modification of the FIGURE 4 circuitry utilizing a multiple version of the movable potentiometers.

Description of the invention

Referring now to FIGURES 1 and 2, the inventive machine generally indicated at 10 includes a support or carriage assembly indicated generally at 11 and comprises a plate 12 and a plate 13 connected to plate 12 by an integral member or plate 18, plate 13 and member 18 forming a rigid inverted T-shaped bracket. Plate 12 is supported by a ball nut 16 and ball spline outer races 17. Plate 13 provides a ball bearing mounting surface for potentiometers 14, plate 12 additionally being provided with bearings to hold the potentiometers 14 in a vertical position. Potentiometers 14 are of the servo-potentiometer type, each having a central shaft 20 and arms 14A and 14B, arm 14A being secured to shaft 20 with arm 14B being fixed to potentiometer 14 (see FIGURE 1). The arms 14A of potentiometers 14 function as a bias pick-off arm 10 of the variable resistance element 9 of the circuitry illustrated in FIGURE 4. Each shaft 20 extends through the associated potentiometer 14 and has ball bearings at support points, within the potentiometer and supported at the ends thereof by ball bearing in plates 12 and 13 of carriage assembly 11. The arms 14B of potentiometers 14 function in the FIGURE 4 circuit as the arm 9' of the resistive winding 9, movement of arm 14B rotates the entire resistance element 9. Both arms 14A and 14B of each potentiometer 14 are movably mounted but are forced toward one another by a spring 15. The springs 15 may, if desired, be internally mounted with the potentiometers. The arms 14A and 14B are provided with inwardly extending end or tip portions, the contacting surface of each end being flat in the direction of a plane through the center of rotation of the arm so that slight misalignment will not cause measuring errors. The end or tip portions of arms 14A and 14B are configured, such as by an end section configured in a plane parallel to the changing cross-section of the specimen, so as to better follow necking or cross-section changes on the specimen. Arms 14A and 14B of both potentiometers should lie in the same horizontal plane so that each measurement is for the same portion of the specimen. As shown in FIGURE 1, the arms 14 are maintained in contact with a specimen 25 via springs 15, and the potentiometers 14 thus measure mutually perpendicular cross-sections of the test specimen 25. While not shown, the test specimen 25 is rigidly retained at its ends in a tensile or compressive test apparatus as known in the art, the test apparatus being actuated to change the cross-section of specimen 25, while the instant machine 10 serves only to measure and record the changes in cross-section and elongation of the specimen undergoing test.

Potentiometers 14 should be selected to be closely matched in performance such that a separation of the arms 14A and 14B of one potentiometer results in the same output as the same amount of separation of the arms of the other potentiometer would produce.

When the arms 14A and 14B of a multiplicity of potentiometers 14 rest on the surface of a specimen 25, the locus of points defined by the potentiometer arms must define, when joined, a closed curve whose area is perpendicular to the specimen axis. In practice this means that the axis of the test specimen 25 must be aligned parallel to the axis of travel of the potentiometer arms. The latter is determined by aligning a ball screw 23 with the axis of the test specimen 25.

In order to prevent slight torques from misaligning the position of the potentiometers 14, ball splines are used to control the linear scanning movement or motion of the potentiometers by constraining carriage assembly 11 to move vertically without twisting. This is accomplished by ball spline outer races 17 guided by inner raceways 19 which are supported at their ends by a top end plate 21 and a bottom end plate 22. As shown in FIGURE 2, plates 21 and 22 are parallel to each other and ball spline raceways 19 are perpendicular thereto.

The travel of the outer races 17 along inner raceways 19 is substantially frictionless. Note the outer races 17 do not support any weight but merely guide the motion as the carriage assembly 11. Other parallel shaft and guide arrangements wherein friction is minimum can be utilized if desired.

The weight of support or carriage assembly 11 is carried on and moved by the ball nut as it is advanced or retracted by a ball screw 23. Ball nut 16 is fixed to plate 12 so that ball screw 23 must be turned to raise or lower carriage assembly 11. Ball screw 23 has journal end mounted in bearings 24 located in plates 21 and 22. The lower end of screw 23 is affixed to a pulley 26, pulley 26 being located in a countersink portion of lower plate 22. A stepping motor 27 is mounted intermediate plates 13 and 22 and secured to plate 22 by bolts, as shown in FIGURE 2, or other appropriate fastening means. The motor 27 provides the driving force to pulley 26 via a belt 26', or other drive interconnection, thus transferring torque from motor 27 to ball screw 23. The size of the pulley 26 can be correlated with the lead of the ball screw 23 so that one step of the motor 27 will move the carriage assembly 11 a predetermined amount.

In operation, potentiometers 14 scan the length of specimen 25 determining its cross-sectional (diminishing or increasing) and its length (increasing or diminishing) dependent upon the specimen being placed under tensile or compressive test by the associated testing mechanism, not shown. The method and means for accomplishing tensile test of the specimen 25 is described hereinafter with reference to FIGURES 3 and 4.

Potentiometers 14 are biased by a battery 31 to provide an output voltage proportional to the position of the potentiometer arms 14A and 14B and hence the cross-section of specimen 25. The output of both potentiometers 14 via arms 10 is put into an adding circuit or amplifier 32 in which a new voltage is formed by adding the two input voltages from arms 10. The new sum voltage is the voltage analogue of the sum of the cross-sections measured by the arms of potentiometers 14. The adding circuit 32 may be one of the many operational amplifier type circuits made to handle D.C. or A.C. signals, which are commercially available.

The analogue voltage sum from adding circuit 32 is then fed into a Schmitt trigger circuit 33, via terminal 34, which compares the voltage placed on terminal 34 with the voltage of terminal 36 obtained from a potentiometer 37 and battery 38. Whenever the input on terminal 34 exceeds the bias level on terminal 36 the Schmitt trigger circuit 33 produces a pulse which changes the state of a bistable multivibrator or flip-flop 39. The flip-flop 39 has states productive of positive or negative voltages alternating between the two on impulse from Schmitt trigger circuit 33 and a change in positive or negative output voltage changes the polarity of a relay or switch 41. It is thus seen that a change in position of relay or switch 41 is accomplished whenever the input 34 to Schmitt trigger 33 exceeds the preset input bias voltage 36.

Relay or switch 41 connects a pulse generator 47 via contacts or leads 42 and 43 or via contacts or leads 42 and 44 to a translator 46 which controls the direction of movement of stepping motor 27. Alternate positive and negative polarities in relay or switch 41 cause a change in the connection of pulse generator 47 to the direction determining windings of translator 46, this direction being determined by the interconnection of contact or lead 42 with contact or lead 43 or with contact or lead 44 of translator 46.

Motor 27 is a stepping motor which steps in preset increments when pulsed through translator 46 which converts pulses from a suitable source such as pulse generator 47 to voltages of suitable polarity for stepping motor 27. Translator 46 may be omitted when appropriate voltages of proper polarity can be obtained from other sources for properly actuating motor 27. The windings of motor 27 are normally connected to translator 46 in such a way that the direction of rotation of the armature of motor 27 can be determined by appropriate pulsing. The rotary direction determining windings of motor 27 must be pulsed with a voltage of one polarity for steps in one direction, and when the polarity is reversed the windings cause the motor to step in the opposite direction.

Before beginning tensile test loading, the larger cross-sectional ends, not shown, of the test specimen 25 to be measured are rigidly positioned in a tensile test machine.

The potentiometer arms 14A and 14B are then set about one end of the test specimen and the bias supply 37 is adjusted so that the Schmitt trigger 33 barely provides an output pulse. The potentiometer arms are then set about the surface of the specimen near the center of its length and no pulse from Schmitt trigger 33 should result. When this occurs the system is ready for operation.

When the Schmitt trigger 33 provides no output, motor 27 steps in one direction moving carriage assembly 11 and potentiometers 14 along the length of specimen 25. This continues until the increasing output of potentiometers 14, caused by the arms 14A and 14B contacting the larger cross-section end of specimen 25, causes the output voltage 34 from adding circuit 32 to exceed the bias voltage 36 whereby Schmitt trigger 33 produces a pulse which activates flip-flop 39 which in turn activates relay or switch 41 changing the position of lead or contact 42, for example, from being in contact with lead or contact 43 to a new position where lead 42 contacts lead 44 causing the direction of stepping motor 27 to be reversed, thereby reversing the movement of carriage assembly 11 and potentiometers 14. The carriage assembly is then driven by motor 27 via screw 23 until the potentiometer arms 14A and 14B contact the other large cross-section end of the specimen 25 causing the circuit to transmit a signal to translator 46 for reversing the direction of motor 27, this sequence continuing back and forth along the length of the test specimen until the test is completed.

Note that the pulse source 47 need not be a pulse geneartor. The pulse source must be selected in accordance with the requirements of motor 27. Once the stepping motor 27 is selected the type of translator 46, if any, and the pulse source 47 will then be determined. Oscillators, square wave generators and the like may be suitable for actuating stepping motor 27.

During operating of the above described apparatus and circuitry, data printout is obtained in the following manner. Potentiometers 14 may each provide a direct measurement of specimen cross-section to a recorder 51 when a switch 52 is moved to the appropriate contact as indicated in phantom. The sum of the analogue voltages from adding circuit or amplifier 32 may be also directed to recorder 51 by selectively positioning switch 52 as shown in solid line in FIGURE 4. Besides recording signals graphically on recorder 51, the analogue signals are converted to digital form by converter 52′ and fed to a digital printer 53.

Specimen length is measured by a counter 54 and recorded by a printer 56, counter 54 being connected to lead or contact arm 42 via leads contacted to leads or contacts 43 and 44. Counter 54 is reset each time switch or relay 41 is activated corresponding to a change in direction of movement of stepping motor 27. As stated above, motor 27 and the ball screw 23 may be correlated so that each step of motor 27 moves support or carriage assembly 11 a known distance. If this distance is set to be one mil, for example, then each step of motor 27, as a result of each pulse from generator 47, for example, as recorded on printer 56 represents one mil. The frequency of the pulse generator sets the rate at which step of motor 27 will be recorded. A typical rate of motor 27 is 100 steps per second.

Throughout the description, bias voltages have been treated as the signals processed in the circuitry, although the circuitry can be readily adapted to bias currents. The embodiment described above utilizes a combination of bias voltages and bias currents to operate successfully. This occurs because the amplifier or adding circuit 32 and Schmitt trigger 33 are generally transistor circuits which are current operated devices. Hence there is an interchange between bias voltages and current.

The above described apparatus can be made more sensitive by increasing the number of potentiometers 14 as illustrated schematically in FIGURE 5. In this manner the variation of the cross-section of specimen 25 can be more closely observed via recorder 51 and printer 56.

In FIGURE 5, four potentiometers 14 are paired with two amplifiers or adding circuits 32, the outputs 34 of which are in turn directed into an adding circuit 32′ whose output 34′ is introduced into Schmitt trigger 33, the remainder of the circuit operating substantially as described above with respect to FIGURE 4. It is thus seen that combining the outputs of a multiplicity of cross-section sensing devices increases the sensitivity of the inventive dimensional measuring machine.

The mechanical design described above and illustrated in FIGURES 1 and 2 can be chanegd in many ways. For example, Thompson ball bushings could be used in place of the ball splines, or a single ball spline centrally located and two ball screws at each end and driven together could be used. Also, the length accuracy measurement could be improved by driving the carriage assembly with an induction motor and attaching an analog-to-digital transducer to generate pulses on the same shaft, which pulses would go directly to the counter.

It has thus been shown that the present invention provides an effective means for continuously measuring the changes in cross-sectional areas and length of a specimen undergoing tensile or compressive testing, this being accomplished by scanning micrometers which produce signals indicative of the cross-section and length they are measuring, the signals be recorded to provide, if desired, a readout for further study or other use.

Although particular embodiments of the invention have been illustrated and described, modifications will become apparent to those skilled in the art, and it is intended to cover all such modifications as come within the spirit and scope of the invention.

I claim:

1. A dimensional measuring apparatus adapted for continuously measuring the changing cross-section and length of a specimen undergoing tensile or compressive testing comprising: a movable carriage assembly, support means for said carriage assembly, means for moving said carriage assembly along said support means, a plurality of potentiometers operatively mounted on said carriage assembly producing an electrical output, each of said potentiometers having a pair of arm members movable relative to one another and acting as voltage dividers, the amount of relative movement between each pair of arm members determining the output of said potentiometers, said arm members being adapted to contact an associated test specimen, electrical circuit means operatively connected to said potentiometers and to an adjustable bias means for comparing the output of said potentiometers with a setting of said adjustable bias means and producing an output signal when the output of said potentiometers exceeds the setting of said adjustable bias means, an electrical pulse source, switch means responsive to said output signal from said electric circuit means functioning to direct an output of said electrical pulse source to said means for moving said carriage assembly, said carriage assembly moving means being reversed in direction upon each actuation of said switch means, means operatively connected to said electric circuit means for recording the relative movement of said potentiometer arm members and indicating said changing cross section, and means operatively connected to said electrical pulse source adapted for recording the amount of movement of said carriage assembly along an associated specimen undergoing test.

2. The apparatus defined in claim 1, wherein said carriage assembly includes a pair of plate members, and means positioned intermediate said plate members to maintain same in space relationship, said potentiometers being operatively mounted intermediate said plate members.

3. The apparatus defined in claim 1, wherein said support means for said carriage assembly includes a pair of support plates and at least one member positioned intermediate said support plates for maintaining same in space relation, said carriage assembly being movably mounted on said member and being moved therealong by said carriage assembly moving means.

4. The apparatus defined in claim 1, wherein means for moving said carriage assembly includes an electric motor, and driving means interconnecting said electric motor and said carriage assembly.

5. The apparatus defined in claim 1, wherein said potentiometer arm members are constructed such that the outer terminal end thereof is adapted to contact an associated test specimen, said outer terminal end having a flat end surface such that slight misalignment of said arm members with an associated test specimen will not cause measuring errors.

6. The apparatus defined in claim 1, wherein said electric circuit means includes an adding circuit means and a Schmitt trigger circuit, said adding circuit means functioning to receive the output from said potentiometers and produce a sum voltage which is fed to said Schmitt trigger circuit, said sum voltage being a voltage analogue of the sum of an associated test specimen cross-section as measured by said potentiometer arm members, said Schmitt trigger circuit being operatively connected to said adjustable bias means and functioning to compare said sum voltage from said adding circuit means with said setting of said adjustable bias means and produce said output signal when said sum voltage exceeds said setting of said adjustable bias means.

7. The apparatus defined in claim 1, wherein said electrical pulse source is a pulse generator, wherein said means for moving said carriage assembly includes an electric motor means having rotary direction determining windings, and additionally including translator means operatively interconnected between said pulse generator and said direction determining windings of said electric motor means, whereby each actuation of said switch means causes electric pulses from said pulse generator to be directed through said translator means to said direction determining winding of said electric motor means so as to reverse the direction of rotation of said electric motor means for reversing the direction of movement of said carriage assembly.

8. The apparatus defined in claim 1, wherein said last mentioned means includes a counter means operatively connnected to said electrical pulse source, and printer means operatively connected to said counter means, said counter means being reset each time said switch means is actuated.

9. The apparatus defined in claim 1, wherein said means for recording the relative movement of said potentiometer arm members is interconnected to said electric circuit means by a switch means adapted to selectively connect said recording means directly with the output of each of said potentiometers and with an electrical output representing an analogue of the sum of an associated test specimen cross-section as measured by said potentiometer arm members.

10. The apparatus defined in claim 1, wherein said plurality of potentiometers comprises at least two pair of potentiometers, said electric circuit means includes an adding circuit means operatively connected to each pair of potentiometers and functioning to receive the output from said pair of potentiometers and produce a sum voltage signal, said electric circuit means including an additional adding circuit means operatively connected to and receive from each of said first mentioned adding circuit means the sum voltage signal and produce another sum voltage signal, said another sum voltage signal being compared by said electric circuit means with said setting of said adjustable bias means for producing said output signal when said another sum voltage signal exceeds the setting of said adjustable bias means.

References Cited
UNITED STATES PATENTS

| | | | |
|---|---|---|---|
| 3,226,833 | 1/1966 | Lemelson | 33—174 |
| 3,237,312 | 3/1966 | Boppel | 33—174 |

SAMUEL S. MATTHEWS, Primary Examiner